United States Patent [19]

Wilber

[11] Patent Number: 5,369,341

[45] Date of Patent: Nov. 29, 1994

[54] VERTICAL RETRACE WITH ZOOM AND CENTERED FAST RETRACE

[75] Inventor: James A. Wilber, Indianapolis, Ind.

[73] Assignee: Thomson Consumer Electronics, Inc., Indianapolis, Ind.

[21] Appl. No.: 987,956

[22] Filed: Dec. 11, 1992

[51] Int. Cl.$^5$ .................. G09G 1/04; H01J 29/70; H03K 4/08

[52] U.S. Cl. .................. 315/389; 315/403; 327/134; 327/139

[58] Field of Search .............. 315/371, 389, 403, 387; 307/228

[56] References Cited

U.S. PATENT DOCUMENTS

| | | | |
|---|---|---|---|
| 3,471,743 | 10/1969 | Olsson et al. | 315/396 |
| 3,705,328 | 12/1972 | Torok | 315/387 |
| 3,713,000 | 1/1973 | Driskell et al. | |
| 4,028,726 | 6/1977 | Argy | |
| 4,820,960 | 4/1989 | Fazio | 315/397 |
| 4,874,992 | 10/1989 | Benson | 315/387 |

FOREIGN PATENT DOCUMENTS 4100103 7/1992 Germany .
57-206178 12/1982 Japan .

OTHER PUBLICATIONS

U.S. Patent Application titled Reduced Dissipation Vertical Deflection Circuit for Zoom Mode Operation by J. Wilber, Ser. No. 911,605, filed Jul. 10, 1992.

*Primary Examiner*—Gregory C. Issing
*Attorney, Agent, or Firm*—Joseph S. Tripoli; Joseph J. Laks; Daniel E. Sragow

[57] ABSTRACT

A television receiver is controlled as to the degree of vertical zoom via a deflection current ramp that varies in slope and which may be delayed to achieve panning. Due to the increased slope when zoomed, the deflection current and the electron beam complete a trace in less time than the normal vertical interval. The deflection current is maintained at one extreme or the other outside the trace interval, and the beam is blanked. A retrace signal generator coupled in a feedback loop with the power supply for the deflection circuit determines the midpoint of the blanking period and generates a fast retrace at or near the midpoint. The feedback loop is arranged to minimize the DC average current in the deflection winding by having a current source responsive to the DC average current for charging a timing ramp that triggers retrace upon reaching a threshold. The slope of the timing ramp varies with DC loading, thus advancing or retarding retrace to center retrace in the blanking interval.

15 Claims, 6 Drawing Sheets

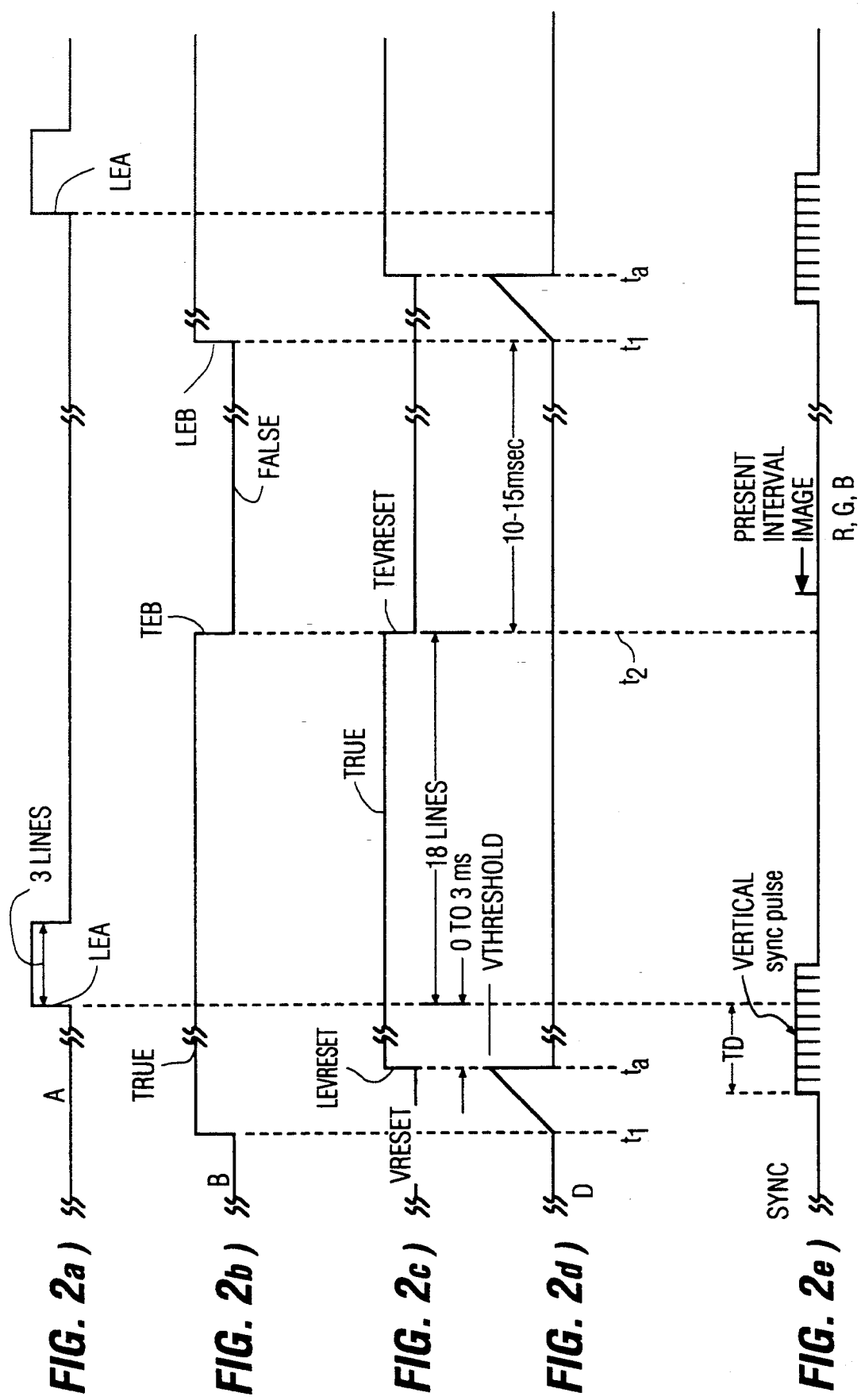

VERTICAL RETRACE WITH ZOOM AND CENTERED FAST RETRACE

The invention concerns a video display deflection apparatus.

If an aspect ratio other than 4×3 is used for video production, an aspect ratio conversion may be performed to enable display of the program on a 4×3 consumer television receiver. For example, a wide aspect ratio program may be formatted for display on a 4×3 television receiver by adding blank top and/or bottom strips, forming a so-called letterbox display, with a 16×9 active area in the 4×3 display area.

A wide screen television receiver is described, for example, in published International Application No. PCT/US91/03822 entitled WIDESCREEN TELEVISION—Rodriguez-Cavazos, et al. The display screen has a format display ratio of e.g. 16×9, and a variety of alternative picture displays are made possible, including zoom or image scale factor control and multiple picture display arrangements.

It may be desirable to display the image content of a baseband video signal conforming to, for example, the NTSC standard that uses an aspect ratio of 4×3, on a display such as a 16×9 wide screen television receiver. Where the picture is in letterbox display format, the raster may be expanded such that the picture fills the wide screen. The horizontal displacement spans the full screen width. The vertical displacement is expanded or zoomed by a factor of 4/3 such that the picture, without top and bottom black strips, fills the wide screen vertically.

Apart from controlling deflection to best fit the picture of a wide screen program on a wide screen display, it may be desirable to zoom a video program for other reasons. For example, when showing a conventional 4×3 picture, the user may wish to expand the picture, enlarging a certain area and cropping off peripheral portions that are less interesting. Such a feature is especially advantageous in connection with a capability for vertical panning of the picture relative to the display.

A vertical deflection circuit typically applies a ramping vertical deflection voltage signal to one input of a differential amplifier. A current sensing resistor in series with the vertical deflection coil is coupled to the other input of the amplifier and senses the deflection current. The amplifier drives the deflection coil in a closed-loop negative feedback manner. The deflection current defines a ramping vertical trace portion and a retrace which is synchronized to vertical sync pulses derived from the video signal.

Vertical zoom may be achieved by increasing the slope or rate of change of the ramping vertical trace portion of the vertical deflection current. This causes the beam to scan across the screen in a shorter time, as needed for zoom, but increases the time in which the beam is at its extremes of deflection and the deflection current is at a significant level. For example, if the deflection current ramp is made more steep from the outset of a vertical field, the electron beam reaches the bottom of the raster sooner. If the deflection current remains such as to hold at the bottom of the raster, e.g., at a small overscan position, the DC component of power supply loading is increased with zoom, due to the need to maintain the beam at the bottom of the raster until retrace.

The electron beam is blanked when not scanning actively across the display screen. One possibility to reduce current loading is to reduce the deflection current to near zero at the end of the zoomed scan, thus returning the beam to the center of the screen while awaiting the next retrace. If cathode ray tubes have significant spurious emission, the beam location may be visible on the screen during retrace if the retrace is slower than the usual time of about 600 to about 1,100 microseconds. Returning the beam to near center thus reduces the DC loading by the deflection circuits, but relies on the blanking circuits and means for minimizing electron emission during blanking, because any spurious beam current may render the beam position visible, as a horizontal line across the center of the display. In a cathode ray tube, the electron gun has a heated cathode, and it is difficult to block all spurious emission of electrons.

It may be desirable that a low average deflection current is maintained, e.g. by locating the beam for part of the vertical blanking period at one extreme of deflection and for part of the period at the other extreme. The retrace thus occurs during the blanking period rather than at the beginning or end. For a given image scale factor (e.g., a 4/3 zoom), the retrace could be timed to advantageously occur at a central point in time within blanking. Advantageously, the retrace may be centered in the blanking period adaptively using a feedback control circuit to determine the appropriate time to begin retrace during zoom modes such that the DC component of the vertical yoke current is appropriately small, accommodating any degree of zoom. The beam is thus placed at its extremes of deflection in a manner that precisely balances the times the beam is disposed at each of the two extremes.

In accordance with an inventive arrangement, a video display apparatus includes a vertical deflection winding located on a cathode ray tube. A source of an image control signal is provided which represents an image scale factor selected from a range of values. A deflection ramp generator responsive to a synchronization signal and to the image control signal generates a ramp with a slope that varies with the selected scale factor. A deflection amplifier is responsive to the ramp for generating in the deflection winding a cyclical deflection current having a period of a vertical interval. The deflection current ranges between a first extreme and a second extreme during a trace interval that is shorter than the vertical interval by a time that varies with the selected scale factor. A retrace signal generator is operable to return the deflection current from the second extreme to the first extreme during a retrace interval that is positioned within a nontrace interval, but not generally positioned adjacent to either end point.

In accordance with a different inventive arrangement, a servo circuit is coupled in the feedback path of a retrace signal generator for positioning a retrace interval within a nontrace interval by means of servo feedback control.

FIGS. 2a–2e illustrate idealized waveforms useful for explaining the timing functions of the arrangement of FIGS. 1a–1c;

Figure 1A:
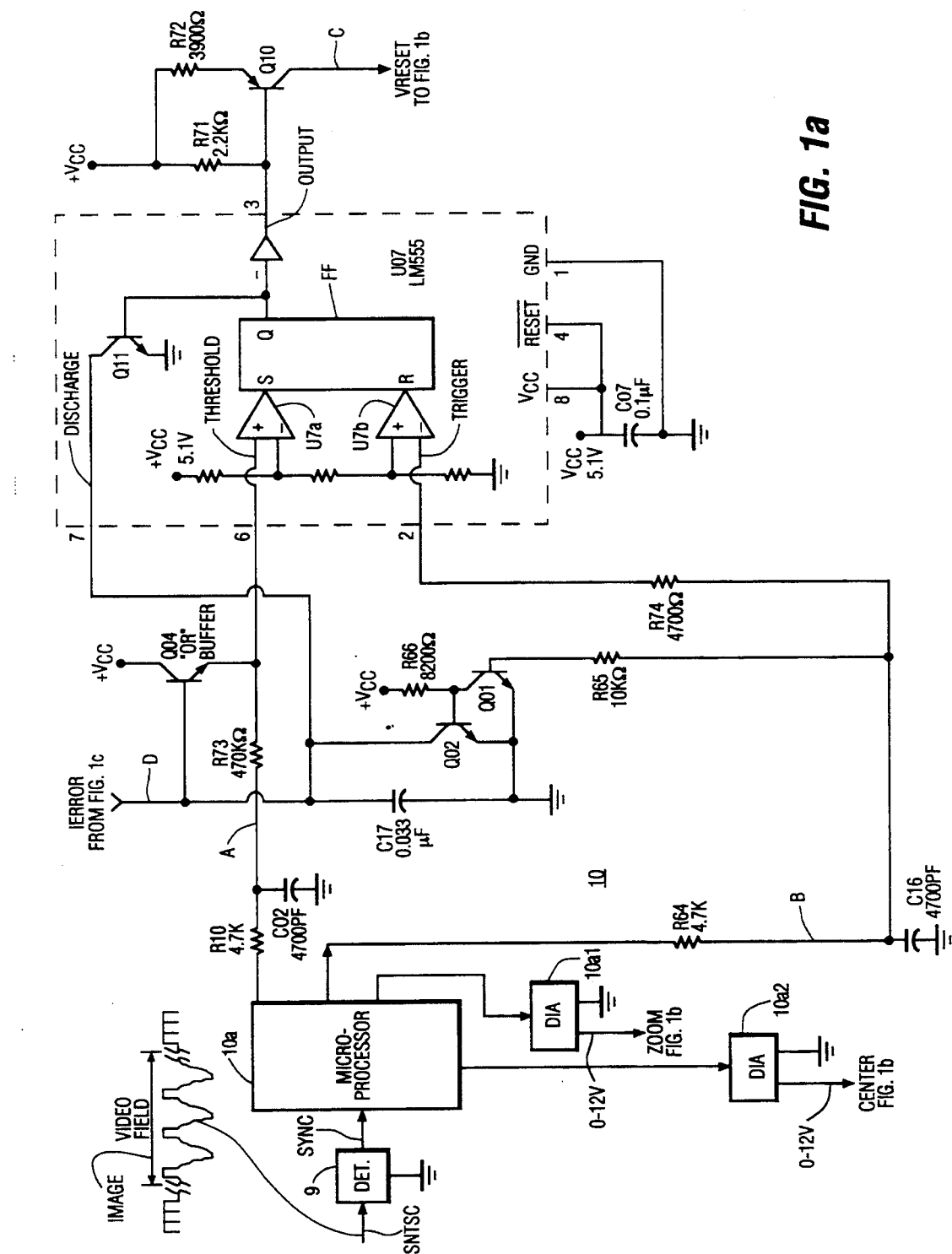
FIGS. 1a, 1b and 1c illustrate an inventive embodiment of a vertical deflection circuit.
Figure 1B:
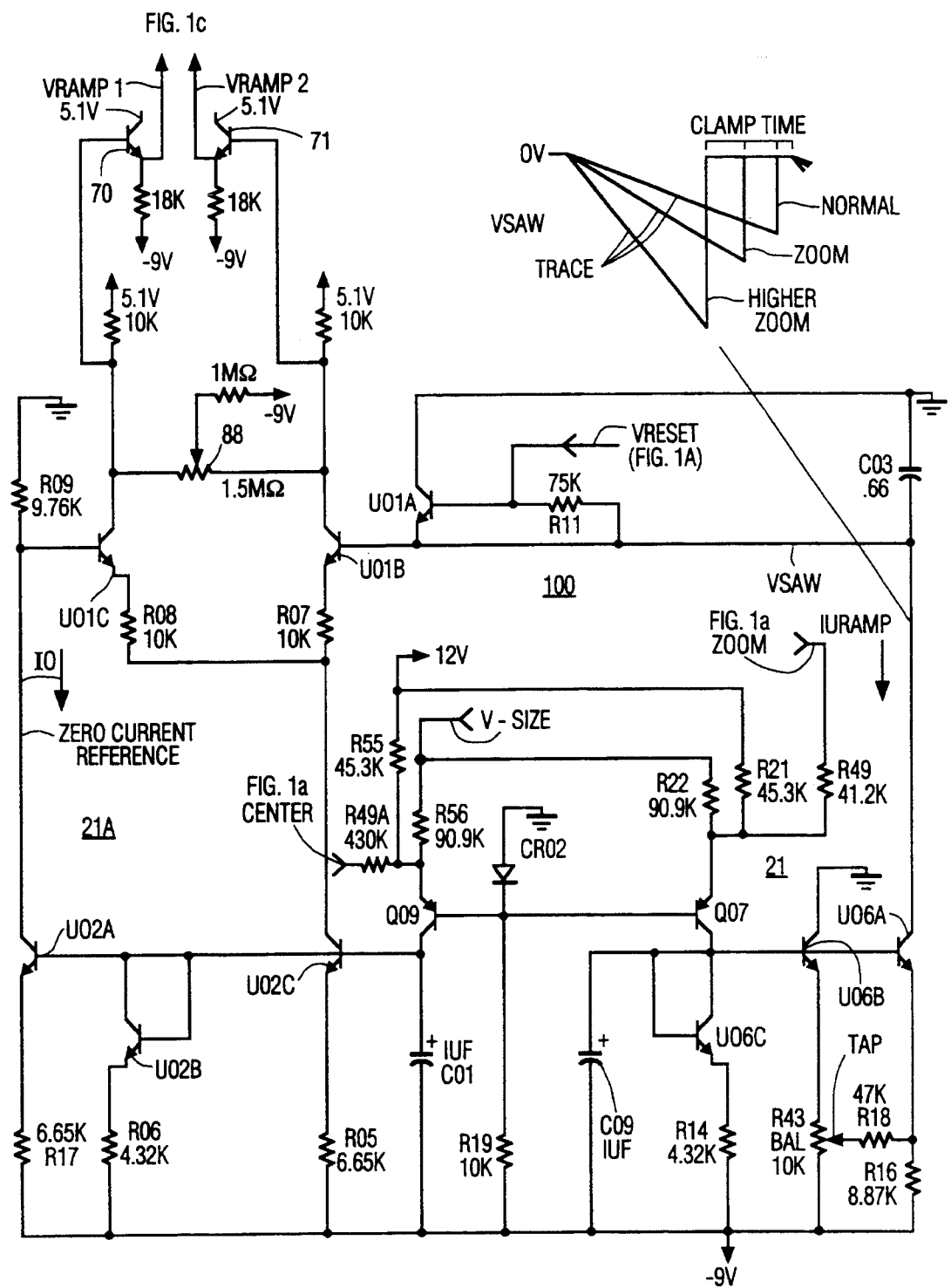
Figure 1C:
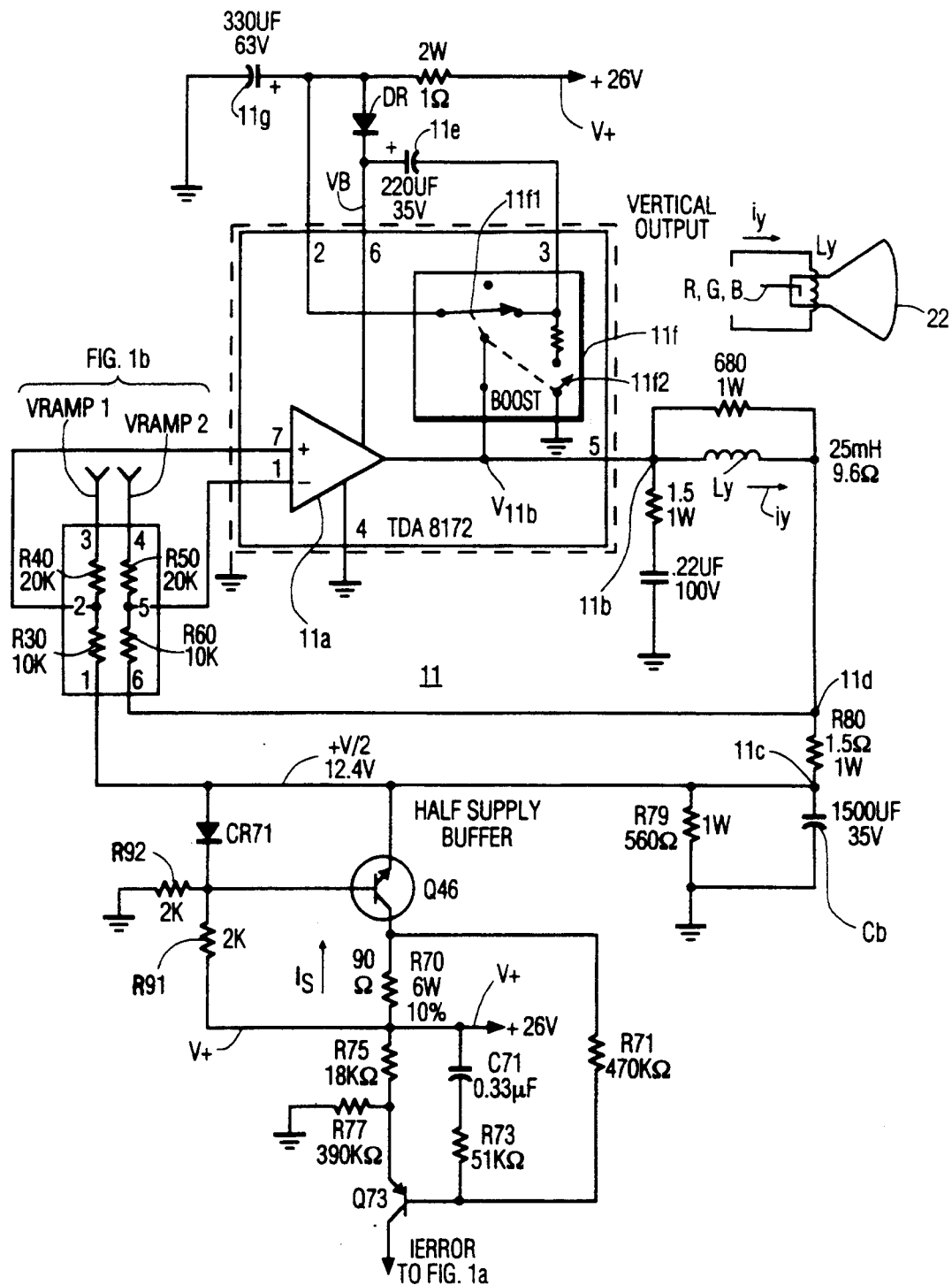

A sawtooth generator 100, shown in detail in FIG. 1b, is controlled as to image scale factor and centering via a microprocessor controller and retrace triggering arrangement, as shown in FIG. 1a, producing vertical deflection signals that are coupled to the vertical deflection coils via an output stage, as shown in FIG. 1c. Corresponding symbols and numerals are used throughout the figures for corresponding signals, items or functions.

A vertical synchronizing signal SYNC of FIG. 1a is coupled to a vertical timing generator 10. Signal SYNC is produced by a video detector 9 of a television receiver that processes a baseband television receiver signal SNTSC, for example conforming to the NTSC standard. The elapsed time between consecutive occurrences of SYNC in signal SNTSC accounts for a vertical interval equal to 262 178 horizontal video line intervals that define a given picture image or field.

Generator 10 includes a microprocessor 10a, shown in FIG. 1a, that generates a vertical cycle synchronizing pulse signal for triggering vertical reset. Under user control, for example via a remote controller, microprocessor 10a generates a pulse signal A, as shown in FIG. 2a, that is delayed by a controllable amount TD relative to pulse signal SYNC as seen in FIG. 2e. By delaying the occurrence of vertical reset relative to the SYNC pulse, microprocessor 10a controls panning of the picture on the screen. The delay may be, for example, a small fraction of the vertical interval between occurrences of SYNC for top panning, or a larger fraction less than a full interval, for bottom panning, or anywhere in between. The amount by which pulse signal A of FIG. 2a is delayed varies in accordance with the degree of panning that is required by the user.

Signal A of FIG. 1a is coupled by a resistor R73 to the trigger input of a pulse stretcher flip-flop U07, and generates a vertical reset signal VRESET in the normal non-zoom mode of operation. A logical OR function with an input signal D is provided by a transistor Q04, for controlling the timing of the vertical reset signal VRESET in the zoom mode of operation. The base of transistor Q04 is coupled to input signal D, generated according to FIG. 1c, from a current IERROR. Current IERROR represents the difference between a reference current level and an average vertical deflection current generated from a power supply powering the vertical output stage. As explained more fully below, the current error IERROR provides a ramping input voltage, represented by signal D, at the leading edge of vertical blanking pulse B (see FIGS. 2b, 2d and 3e).

When the ramping input voltage reaches the threshold of the triggering input of flip-flop U07, signal VRESET is generated at a signal line C. The leading edge LEVRESET of the VRESET pulse, shown in FIG. 2c, initiates vertical retrace. Vertical retrace is thus controlled to occur earlier or later as a function of the difference between the deflection current produced by the power supply and a reference level. The circuit minimizes the DC current loading of the half supply arrangement by equalizing the time during which the vertical deflection current is at its extremes following the vertical trace, and responds adaptively to variations in the amount of time between the end of the current vertical trace ramp and the beginning of the next cycle trace ramp, that results from variations in the amount of zoom and the corresponding variations in the slope of the vertical trace ramp.

Immediately after the trailing edge TEVRESET of signal VRESET, a transistor U01A of FIG. 1b becomes nonconductive. A DC current IURAMP through the collector of a transistor U06A of a voltage-to-current (V/I) converter 21, then charges a capacitor C03 to produce a voltage ramp that defines the trace portion TRACE of the vertical deflection signal VSAW, shown in FIG. 1b. The slope of ramp TRACE of deflection signal VSAW is determined by the magnitude of controllable collector current IURAMP of transistor U06A.

V/I converter 21 is controlled by an analog voltage ZOOM which services as an image scale factor control signal. Voltage ZOOM is generated by a digital-to-analog (D/A) converter 10a1 coupled to the microprocessor 10a as shown in FIG. 1a. Voltage ZOOM represents the degree of zoom required by the user, and is arranged in the circuit to vary the rate of change of a vertical deflection current iy applied to a vertical deflection coil Ly as shown in FIG. 1c.

Voltage ZOOM of FIG. 1b is coupled via a resistor R49 of FIG. 1b to the emitter of a current control transistor Q07. An adjustable voltage V-SIZE, that may be adjusted manually using a potentiometer (not shown), is coupled via a resistor R22 to the emitter of transistor Q07 for picture height service adjustment purposes. In addition, a DC supply voltage of +12 V is coupled to the emitter of transistor Q07 via a resistor R21. The base of transistor Q07 is coupled to a diode CR02 that develops a temperature compensating base voltage equal to the forward biased voltage of diode CR02. The voltages that are coupled via resistors R21, R22 and R49 produce a collector current in transistor Q07 that controls the voltage at the base of current source transistor U06A. The base voltage of transistor U06A, determined by the collector current of transistor Q07, is developed in a series arrangement of a temperature compensating transistor U06C, whose base and collector are coupled to function as a diode, and a resistor R14 that is coupled to a −9 V supply.

A resistor R16 is coupled between the emitter of transistor U06A and the −9 V supply voltage. A transistor U06B has a base voltage that is equal to the base voltage of transistor U06A. A potentiometer resistor R43 is coupled between the emitter of transistor U06B and the −9 V voltage supply. A resistor R18 is coupled between the emitter of transistor U06A and an adjustable moveable contact TAP of resistor R43.

When contact TAP is moved close to the junction of the emitter of transistor U06B and resistor R43, resistor R18 has no effect on the emitter current in transistor U06A because the emitter voltage of transistor U06B is equal to that of transistor U06A. On the other hand, when contact TAP is adjusted closer to the −9 V supply, resistor R18 is coupled more in parallel with resistor R16. Potentiometer resistor R43 thereby adjusts the current gain of V/I converter 21 to enable compensation for tolerances of capacitor C03, producing the sawtooth voltage as current is drawn by transistor U06A.

Voltage VSAW from capacitor C03 is coupled to the base of a transistor U01B. Transistor U01B is coupled with a transistor U01C to form a differential pair. The base of transistor U01C is coupled to one terminal of a resistor R09, having an opposite terminal at ground potential. A transistor U02A draws a current I0, setting the voltage at the base of transistor U01C through resistor R09. The base voltage of transistor U01C tracks variation of height adjustment voltage V-SIZE so as to maintain vertical centering. Current I0 provides a zero current reference, setting voltage VSAW to a level that produces a correctly timed zero point to the vertical deflection current, as explained later on.

To develop current I0 through transistor U02A in FIG. 1b, a second V/I converter 21A, similar to V/I convertor 21, is utilized. A transistor Q09 produces a collector current that tracks the collector current in transistor Q07, when an adjustment in height adjustment voltage V-SIZE is made. Voltage V-SIZE is coupled to the emitters of transistors Q07 and Q09 via resistors R22 and R56, respectively. The bases of transistors Q09 and Q07 are coupled at the cathode of diode CR02 and are at equal voltage. Transistor U02B and resistor R06 form a temperature compensated main load with respect to the collector current of transistor Q09. A similar load with respect to the collector current of transistor Q07 is formed by the network of transistor U06C and resistor R14. Transistor U02A of V/I converter 21A produces current I0.

Advantageously, current I0 tracks variations in current IURAMP of transistor U06A in a way to maintain vertical centering unaffected when a change in height adjustment voltage V-SIZE occurs. The tracking occurs because of circuit symmetry, for example, the symmetry with respect to transistors U06A and U02A. A transistor U02C produces the emitter currents of transistors U01C and U01B. An emitter resistor R17 establishes the value of a base voltage-to-collector current ratio in transistor U02A. A resistor R49A couples a voltage CENTER, generated in a D/A converter 10a2 of FIG. 1a, to the emitter of transistor Q09. Voltage CENTER is controlled in a manner to produce approximately equal collector currents in transistors Q09 and Q07 when the zoom mode is not selected. Voltage CENTER compensates for a non-zero offset value of voltage ZOOM when the zoom mode is not selected.

The base voltage of transistor U01C of FIG. 1b is controlled by current I0. The values of resistor R09 and current I0 are selected such that the base voltage of transistor U01C is equal to the level of voltage VSAW at the base of transistor U01B at the time of the midpoint of the image interval, when the regular (non-zoom) mode is selected. Advantageously, as a result of tracking between V/I converters 21 and 21A, any change in size adjustment voltage V-SIZE and in the 12 V supply voltage does not affect a ratio between currents I0 and IURAMP. The resulting variations in currents I0 and IURAMP maintain the base voltage of transistor U10C at the level of sawtooth voltage VSAW that corresponds to vertical center for each level of voltage V-SIZE and of the 12 V supply voltage, until saturation occurs. Therefore, vertical centering is, advantageously, unaffected by adjustment of voltage V-SIZE that is used for adjusting picture height. The emitters of transistors U01B and U01C are coupled via emitter resistors R07 and R08, respectively, to the collector of transistor U02C that controls the sum of the emitter currents. The base voltage of transistor U02C is the same as that of transistor U02A. During vertical trace, the emitter voltage of transistor U02C, that is approximately equal to that of transistor U02B, produces an emitter current in transistor U02C that is determined by a resistor R05.

Figure 3A:
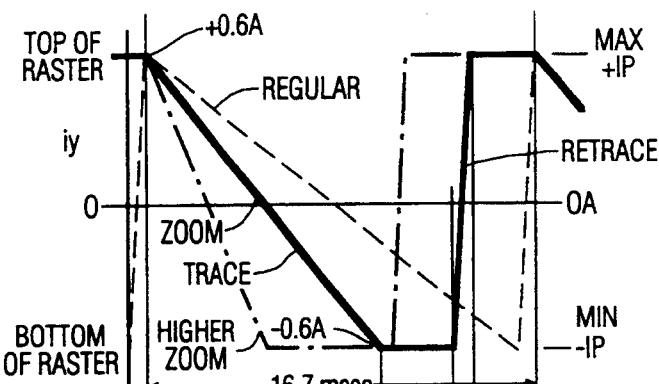
FIG. 3 illustrates current, voltage and timing waveforms useful for explaining the operation of the arrangement of FIGS. 1a–1c when top panning is provided.
Figure 3B:
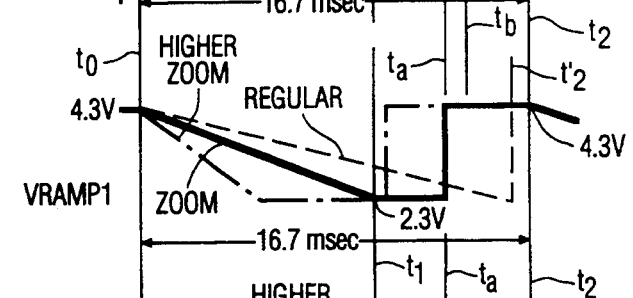

During vertical trace in the zoom mode, such as during interval t0–t1 in FIG. 3b, transistors U01B and U01C form a differential amplifier. The collector currents of transistors U01B and U01C develop, in corresponding collector resistors, voltages that are coupled via emitter follower transistors 71 and 70 to develop sawtooth signals VRAMP2 and VRAMP1, respectively.

FIGS. 3a–3f illustrate waveforms useful for explaining the operation of the arrangement of FIGS. 1a1c. Blanking signal B, vertical reset signal VRESET and retrace timing signal D are shown again in FIG. 3e for comparison with the current and voltage waveforms of FIGS. 2a–2d and the functional timing diagram of FIG. 3f, and in connection with the amount of zoom shown in FIGS. 3a–3d.

Figure 3C:
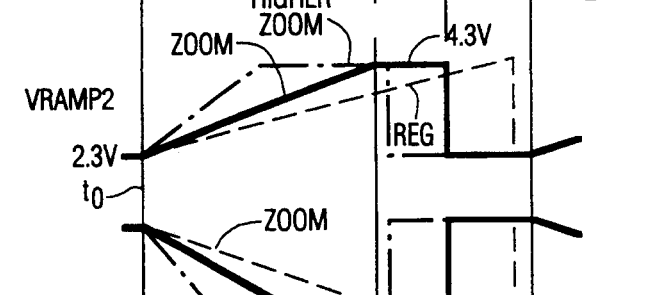

Signals VRAMP1 and VRAMP2 of FIGS. 3b and 3c, respectively, are complementary signals that change in opposite directions during the vertical trace interval t0–t1. The waveforms of FIGS. 3b and 3c that are drawn in solid line occur in the zoom mode of operation, for comparison with the waveforms in dashed line, occurring in the regular or non-zoom mode of operation. An even greater degree of zoom is shown in dash-dot line. Vertical trace occurs between, for example, time t0 and t1 when the zoom mode is selected, and between time t0 and time t2 when the zoom mode is not selected, as shown in the waveforms of FIGS. 3a–3d.

A DC coupled deflection circuit 11 of FIG. 1c, is controlled by signals VRAMP1 and VRAMP2. In circuit 11, a deflection winding Ly provides vertical deflection in a cathode ray tube, CRT 22, for example of the type W86EDV093X710, having an aspect ratio of 16×9.

Winding Ly is coupled in series with a deflection current sampling resistor R80. Winding Ly and resistor R80 of FIG. 1c form a series arrangement that is coupled between an output terminal 11b of an amplifier 11a and a junction terminal 11c of a power supply decoupling capacitor Cb. A resistor R70 couples a supply voltage V+, for example +26 volts, to terminal 11c via an emitter follower transistor Q46. Transistor Q46 produces a DC voltage +V/2 at terminal 11c that is equal to about one half of voltage V+, in particular about +12.4 volts. The half supply voltage is determined by coupling the base of transistor Q46 to the junction of voltage dividing resistors R91 and R92. A junction terminal 11d, coupled between winding Ly and resistor R80, is coupled via a feedback resistor R60 to an inverting input terminal of amplifier 11a. Terminal 11c of resistor R80 is coupled via a resistor R30 to a noninverting input terminal of amplifier 11a. A negative feedback voltage is developed across resistor R80, representing the current in deflection coil Ly, and is applied to the input terminals of amplifier 11a. Amplifier 11a develops an output voltage as needed to cause the deflection coil current to track the voltage drive signal applied to the amplifier, as derived from sawtooth voltage signal VSAW by way of complementary voltages VRAMP1 and VRAMP2.

Complementary sawtooth signals VRAMP1 and VRAMP2 are coupled via resistors R40 and R50, to the noninverting and inverting input terminals, respectively, of amplifier 11a for controlling deflection current iy. Differences between signals VRAMP1 and VRAMP2 due to component mismatch or offset voltage tolerances, for example, are compensated by a potentiometer 88 that is coupled between the collectors of transistors U01B and U01C. The vertical trace portion of deflection current iy begins at time t0, shown in FIGS. 3e and 3f, when signals VRAMP1 and VRAMP2 begin to ramp from one extreme toward the other.

When top panning is utilized, signal VRESET of FIG. 2c, is produced from or synchronized to the vertical synchronization pulse signal SYNC, shown in FIG. 2e. Signal SYNC is associated with the picture information that follows signal SYNC in signal SNTSC, and occurs immediately prior to an image interval IMAGE of signal SNTSC. Image interval IMAGE of FIG. 2e contains the picture information that is to be presently displayed on CRT 22 of FIG. 1c. The vertical trace portion of deflection current iy begins after the same delay time relative to the vertical sync pulse (which can be changeable when varying the extent of vertical panning), in each successive field or image interval. As a result, deflection current iy of FIG. 1c is properly synchronized in each period. Therefore, advantageously, field-to-field variations of sync signal SYNC will not cause vertical position jitter of the displayed picture.

Figure 3D:
Figure 3E:
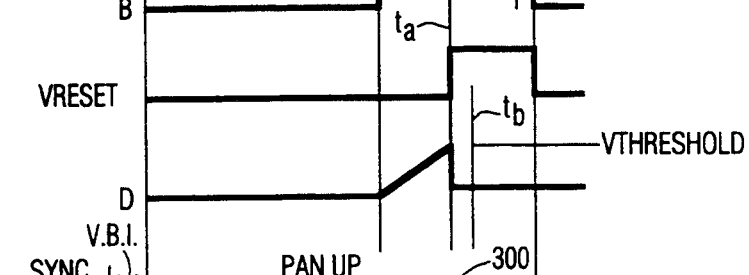
Figure 3F:
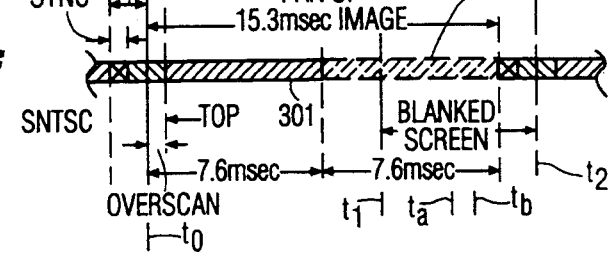

FIG. 3a illustrates in solid line the deflection current iy waveform when a first exemplary amount of zoom is selected, and in dash-dot line the deflection current for a higher degree of zoom. The non-zoom regular mode is shown by a dashed line wherein the trace portion of the deflection current occupies most ( 15.7 mS) of the 16.7 mS interval between successive occurrences of SYNC. FIGS. 3b–3d illustrate respective voltages using the same line conventions, and FIG. 3e is specific to the amount of zoom shown in solid line in FIGS. 3a–3d. FIG. 3f illustrates schematically an example of the timing diagram of signal SNTSC of FIG. 1a, for the first exemplary amount of zoom. Interval 301 of interval IMAGE in FIG. 3f would contain the picture information for the top half of the picture displayed in a non-zoom mode of operation. An interval 300 contains the picture information of the bottom portion of such picture; however, interval 300 is not used because the picture is zoomed such that interval 301 is used for the whole vertical display area. During interval 300, the video is blanked.

Signal SYNC, occurring at the time shown in FIG. 3f, controls the beginning time of vertical trace in this top-panning mode. Vertical trace therefore begins, in each vertical field, at time t0. A top panning mode of operation is obtained when a bottom portion of the displayed picture is cropped by a greater amount than a top portion. Thus, the example of FIGS. 3a–3f depicts maximum top panning. This is so because a video line TOP that is the first video line of interval 301 of FIG. 3f capable of providing picture information in the non-zoom mode of operation is also the first video line to provide the picture information in the maximum top panning mode. As discussed below, it is also possible to use a bottom panning or a centered arrangement. However, top panning is discussed first for purposes of simplicity.

In regular, non-zoom operation, the beginning time t0 of a trace portion of current iy of FIG. 3a, shown in dashed line, may be delayed slightly less in order to keep the same video picture element at the top of the screen. The difference in delay compensates for the difference that occurs in the beginning of vertical trace, between the rate of change of current iy of FIG. 3a in the zoom mode of operation and that in the regular, non-zoom mode of operation.

Figures 4A, 4B:
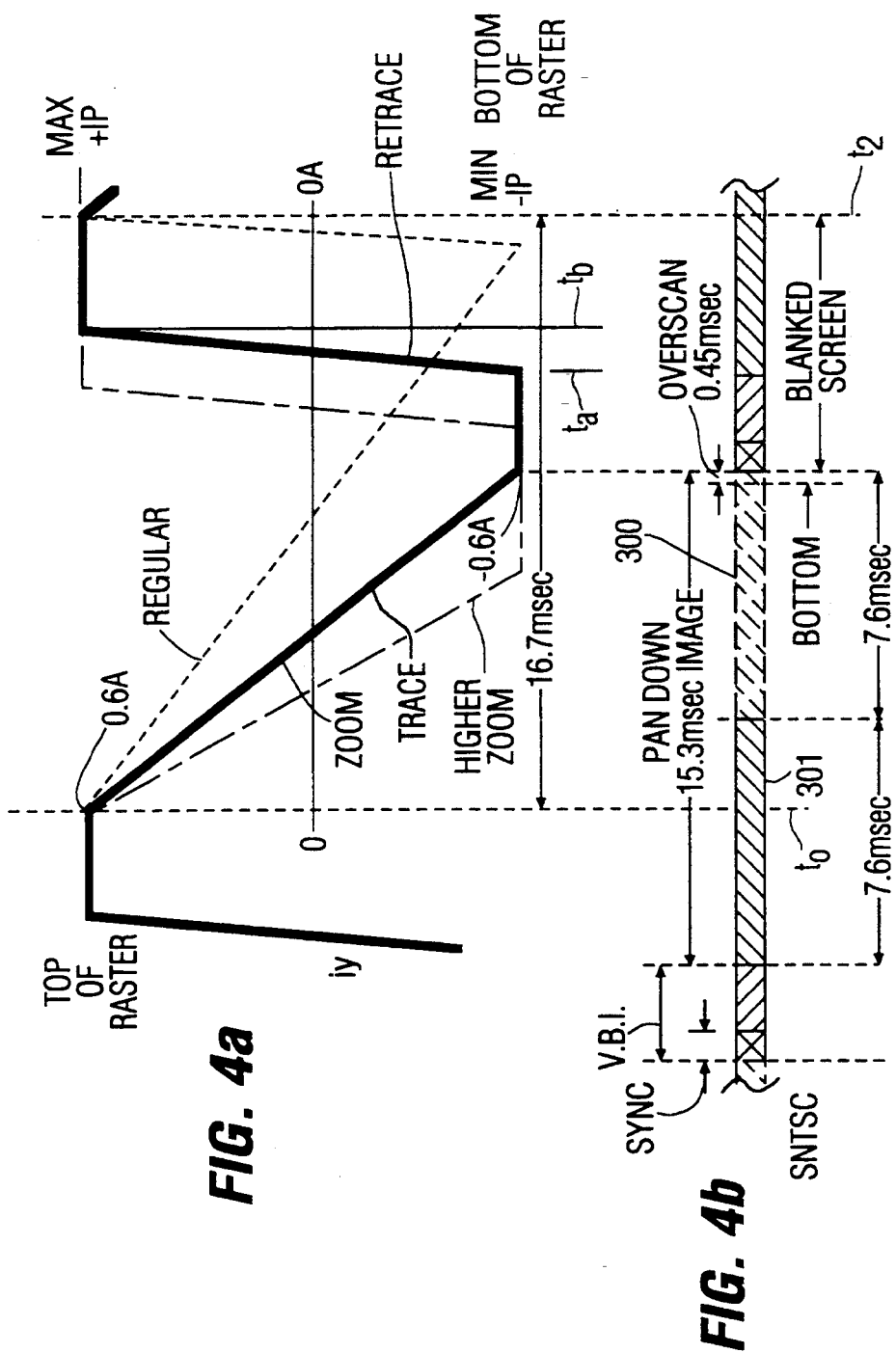
FIG. 4 illustrates comparable selected waveforms useful for explaining the operation of the arrangement of FIGS. 1a–1c when bottom panning is provided.

The example of FIGS. 4a and 4b illustrates a comparable case wherein the last video line BOTTOM of interval 300 of image interval IMAGE is arranged to occupy the bottom of the display screen, i.e., at maximum bottom panning. Similar symbols and numerals in FIGS. 4a, 4b, 3a–3f, 2a–2e and 1a–1c are used for similar items or functions The delay between SYNC and the commencement of the trace ramp in current iy of FIG. 4a with respect to signal SNTSC of FIG. 4b is significantly longer than the delay according to FIG. 3a, as needed to expand or zoom the bottom portion of the picture rather than the top. It will be appreciated that by choice of an appropriate delay, which can be by horizontal line counting or the like, a top pan or bottom pan, or any position in between may be selected.

It is advantageous for purposes of circuit simplicity to utilize a deflection circuit 11 as in FIG. 1c, relying on a positive supply voltage V+ and not requiring a negative supply voltage for generating an alternating deflection current iy. A half supply voltage +V/2 is derived from the full supply voltage V+, e.g., 26 volts, for driving the deflection circuit. Current limiting resistor R70 is coupled to voltage V+ for generating, via transistor Q46, the half supply voltage at terminal 11c.

It is desirable to reduce the average or DC current through current limiting resistor R70 so that a large resistance can be used. The large value of resistor R70 is desirable to provide for current limitation so that excessive deflection current iy may be prevented if a fault condition occurs. Such fault condition may occur, for example, if output terminal 11b of amplifier 11a is shorted to ground. It may also be desirable to prevent excessive deflection current iy in order to avoid damage to the neck of CRT 22 by a beam current strike.

In accordance with an inventive feature, the average value of the deflection current iy is reduced or limited, in the zoom mode of operation. Referring to FIG. 3a, this is accomplished by adjusting the timing of the leading edge of VRESET so that retrace commences at or near the midpoint of the interval between time t1, when trace is completed, and time t2, immediately prior to the beginning of the next vertical trace. Thus, the vertical retrace interval ta-tb is positioned within the nontrace interval t1-t2, but is not generally adjacent to either end point t1 or t2. By balancing the time at which the deflection current is at its opposite extremes, the average value of the deflection current is minimized.

As shown in FIG. 1c, the collector of half supply transistor Q46 is coupled to the positive supply V+ through resistor R70, and the base of transistor Q46 is coupled to a voltage divider having equal value resistors, R91 and R92, thus setting the base voltage of transistor Q46 at half the level of V+. The emitter of transistor Q46 is thereby regulated to half the voltage at V+, less the forward biased base-emitter voltage of transistor Q46. The current Is supplied by the half supply, flowing through resistor R70, produces a voltage signal at the collector of transistor Q46 representing the level of current Is. This voltage signal is filtered by the network including capacitor C71 and resistors R71 and R73, and applied to the base of an error amplifier transistor Q73. The network of capacitor C71 and resistors R71 and R73 form an integrator applying to error amplifier Q73 a voltage that varies with the average current supplied through half supply transistor Q46. The output of the error amplifier transistor Q73 is a current proportional to the amount by which the half supply current exceeds a reference level of about 13 mA according to the circuit values of the embodiment shown. The half supply emitter resistor R79 sinks about 21 mA. Feedback via diode CR71 causes the circuit to regulate near 21 mA, keeping supply transistor Q46 in conduction during at least a portion of the vertical interval.

Referring to FIG. 1a, the current output IERROR of error amplifier transistor Q73 is coupled to a timing capacitor C17. The timing capacitor is disabled by a timer switch Q02 and an inverter Q01, except when signal B is high. Signal B is the vertical blanking signal generated by microprocessor 10a, and is at the high blanking level except during vertical trace. It is used by blanking circuitry, not shown, to blank the screen of CRT 22. In the zoom mode, the leading edge of blanking occurs earlier than the vertical timing signal A, generated by the microprocessor to initiate a new vertical trace in the non-zoom mode.

Current signal IERROR from error amplifier Q73 in FIG. 1c is coupled to capacitor C17, charging the capacitor to produce a voltage signal D as shown in FIG. 2d (see also FIG. 3e), that ramps upwardly at a rate proportional to IERROR. This timing signal D is coupled to the base of transistor Q04, which forms a buffer between capacitor C17 and the threshold input of flip-flop IC U07. The threshold input of IC U07 is one input to a comparator U7a, the other input being coupled internally to a voltage divider setting a threshold of about 3.4 volts. When the buffered ramp exceeds the threshold level, the set input of the flip-flop FF in IC U07 triggers, causing the Q output of flip-flop FF to go high and the low-true output at pin 3 to go low. This low-true output is coupled to the base of a transistor Q10, which clamps the VRESET signal C high, initiating a fast vertical retrace by clamping voltage signal VSAW via transistors U01A and U01B in FIG. 1b. Simultaneously, the output of the flip-flop in IC U07 turns on a transistor Q11 to discharge timing capacitor C17.

The amount of current IERROR produced by the error amplifier of Q73 in FIG. 1c is determined by the emitter voltage set by the voltage divider of resistors R75 and R77, and by the voltage signal at the base of transistor Q73, coupled from the collector of the half supply regulator transistor Q46 by resistor R71. The gain of the current amplifier is set in conjunction with the value of timing capacitor C17 (FIG. 1a) and the threshold defined by the internal voltage divider in IC U07 such that the threshold is reached and retrace is initiated at a time causing the deflection current during retrace to cross zero current near the midpoint of the blanking interval, as shown in FIG. 3a. As a result, the DC component of the deflection current is appropriately small, and can be zero or a small absolute value.

The timer IC U07 remains in a state clamping VRESET high, until the vertical blanking signal B from microprocessor 10a drops below the trigger input voltage of IC U07. The trigger input of IC U07 is also arranged to be coupled to a comparator U7b which triggers at about 1.7 volts. When this occurs, signalling the beginning of a new vertical trace, output pin 3 of IC U07 again goes high, releasing the clamping of VRESET and allowing VSAW to begin a new trace ramp. Simultaneously, IC U07 releases discharge pin 7, enabling timer capacitor C17 for timing during the next vertical blanking pulse B.

Vertical timing signal A from microprocessor 10a is OR'ed with timing ramp signal D via resistor R73, coupled to the threshold input of IC U07 and the emitter of buffer transistor Q04. In the normal (non-zoom) mode of operation, timing ramp signal D may not reach the threshold level at the input of IC U07 before the leading edge of vertical timing signal A. In that mode, the leading edge of timing signal A sets the flip-flop in IC U07 and initiates clamping of VRESET and retrace of VSAW synchronously with the leading edge of timing signal A.

The circuit as thus described causes the leading edge of VRESET in the zoom mode, and the initiation of vertical retrace by clamping signal VSAW, to occur after the beginning of blanking (i.e., after the change of state of signal B), by an amount determined by the ramping voltage on signal D. The circuit responds adaptively to changes in the amount of zoom, to minimize the DC current loading of the half supply. As discussed above, the error amplifier of transistor Q73 produces a current representing the amount by which the half supply current varies from a reference level.

Assume the amount of zoom and the slope of the trace ramp are increased suddenly, for example from the amount shown in solid line in FIG. 3a to the amount shown in dash-dot line, so that the deflection current reaches its negative maximum sooner. Before further servo adjustment is initiated, the longer dwell time, for example at the negative maximum, for a greater proportion of the vertical interval, produces a DC deflection current offset and a change in DC current loading of the half supply. This results in the current output of error amplifier Q73 being likewise changed as a function of the difference in supplied current from the reference level. A larger current IERROR then causes a faster rising ramp in signal D, making VRESET occur earlier in the vertical blanking period defined by signal B.

In this manner, if the amount of zoom is increased and the deflection current reaches its negative peak sooner, the delay between the blanking signal and the vertical reset is increased and the retrace is advanced in a feedback servo manner. Similarly, if the amount of zoom is decreased, such that the negative peak occurs later, retrace is retarded to a later point in the vertical blanking period. As illustrated by the dashed line waveform of FIG. 3a, at the latest, retrace occurs between times t2'-t2, with the vertical synchronizing signal A, defining the normal, non-zoom mode. For any amount of zoom, the timing of retrace is adjusted automatically to occur at or near the midpoint of retrace, by the advantageous feedback control circuit, wherein DC current loading of the half supply is sensed and controlled by adjusting the timing of the leading edge of VRESET.

Signal VSAW as shown in FIG. 3d continues to ramp downwardly during the beginning of the blanking interval; however, VRAMP1 and VRAMP2 level out at the saturation voltages of the differential amplifier arrangement of FIG. 1b, e.g., at about 2.3 and 4.3 volts, respectively. At the leading edge of VRESET, signal VSAW is clamped high by transistor U01A, causing VRAMP1 and VRAMP2 to switch to their opposite states. Deflection amplifier 11a in FIG. 1c then ceases operating in a linear feedback mode and a voltage VB at supply terminal 6 of amplifier 11a is applied to deflection winding Ly via output terminal 11b. A retrace voltage V11b is produced immediately after time ta in FIG. 3a, to enable deflection current iy to complete retrace by time tb. Switch 11f1 in FIG. 1c of a boost stage 11f causes a capacitor 11g to be coupled in series with a boost capacitor 11e. Capacitor 11e is charged via a diode DR and a switch 11f2 from the +26 V supply voltage V+, during vertical trace. A supply voltage, developed across filter capacitor 11g, is summed up with a voltage developed across boost capacitor 11e so as to form boost voltage VB. Voltage VB is decoupled from the +26 V supply voltage V+ via a diode DR, when boost voltage VB is formed. During the short interval ta-tb in FIGS. 3a and 3e, retrace portion RETRACE of current iy is produced. Electromagnetic energy stored in deflection winding Ly of FIG. 1c due to current iy is used in the boost circuit, shown schematically as switch 11f1, to generate the vertical retrace voltage V11b at terminal 11b of FIG. 1c that is larger than voltage V+, causing a fast retrace.

Near time 1b, deflection current iy has increased in value to a point which permits linear operation of amplifier 11a. Feedback from resistor R80 enables the deflection current to follow the flat top portions of VRAMP1 and VRAMP2 between times tb and t2. At the end of vertical retrace, at time t2 deflection amplifier 11a of FIG. 1c, operating in its linear feedback mode, again produces the sawtooth trace portion of deflection current iy.

What is claimed is:

1. A video display apparatus, comprising:
   a cathode ray tube;
   a vertical deflection winding on said cathode ray tube;
   a source of an image control signal representing an image scale factor selected from a range of values;
   a source of a vertical synchronization signal;
   a deflection ramp generator responsive to said synchronization and image control signals for generating a ramp that varies with the selected scale factor;
   a deflection amplifier responsive to said ramp for generating in said deflecting winding a cyclical deflection current having a period of a vertical interval, the deflection current ranging between a first extreme and a second extreme during a trace interval that is shorter than the vertical interval by a time that varies with the selected scale factor; and
   a retrace signal generator operable to return the deflection current from the second extreme to the first extreme during a retrace interval that is positioned within a nontrace interval, but not generally positioned adjacent to either end point of the trace interval,
   wherein a timing means of the retrace signal generator is operable to generate said retrace interval substantially centered about a midpoint of the time by which the trace interval is shorter than the vertical interval.

2. The video display apparatus according to claim 1, wherein the ramp generator, the deflection amplifier and the deflection winding form a DC-coupled vertical deflection circuit, and the retrace signal generator reduces a DC average current in said deflection winding.

3. A video display apparatus, comprising:
   a cathode ray tube;
   a vertical deflection winding on said cathode ray tube;
   a source of an image control signal representing an image scale factor selected from a range of values;
   a source of a vertical synchronization signal;
   a deflection ramp generator responsive to said synchronization and image control signals for generating a ramp with a slope that varies with the selected scale factor;
   a deflection amplifier responsive to said ramp for generating in said deflecting winding a cyclical deflection current having a period of a vertical interval, the deflection current ranging between a first extreme and a second extreme during a trace interval that is shorter than the vertical interval by a time that varies with the selected scale factor; and
   a retrace signal generator operable to return the deflection current from the second extreme to the first extreme during a retrace interval that is positioned within a nontrace interval, but not generally positioned adjacent to either end point of the trace interval, and wherein the ramp generator, the deflection amplifier and the deflection winding form a DC-coupled vertical deflection circuit, and the retrace signal generator reduces a DC average current in said deflection winding,
   wherein the retrace signal generator is coupled in a feedback loop to the vertical deflection circuit to advance or retard the retrace interval to minimize the DC average current.

4. The video display apparatus according to claim 4, wherein the retrace signal generator is coupled to the vertical deflection circuit by a current error amplifier operable to produce an error current signal as a function of a difference between the DC average current and a reference level, the error current signal being coupled to charge a capacitor, and further comprising a threshold detector operable to trigger the initiation of the retrace interval when a timing ramp signal on the capacitor reaches a threshold.

5. The video display apparatus according to claim 3, further comprising a power supply for generating a first supply voltage and a second supply voltage having the same polarity as said first supply voltage, the first and second supply voltages being coupled to opposite ends of the deflection winding.

6. The video display apparatus according to claim 5, further comprising a current limiting resistor coupled to the deflection circuit, a lower voltage one of the first and second supply voltages being coupled to produce a nominal current in the current limiting resistor, and wherein the retrace signal generator is responsive to a difference between the nominal current and the current in the current limiting resistor.

7. The video display apparatus according to claim 3, further comprising a current limiting resistor coupled to the deflection circuit, and wherein the retrace signal generator is operable to minimize a DC current flowing in the current limiting resistor.

8. The video display apparatus according to claim 3 further comprising a power supply for generating a first supply voltage and a second supply voltage having the same polarity as said first supply voltage, the first and second supply voltages being coupled to opposite ends of the deflection winding.

9. A video display apparatus, comprising:
   a cathode ray tube;
   a vertical deflection winding on said cathode ray tube;
   a source of an image control signal representing an image scale factor selected from a range of values;
   a source of a vertical synchronization signal;
   a deflection ramp generator responsive to said synchronization and image control signals for generating a ramp with a slope that varies with the selected scale factor;

a deflection amplifier responsive to said ramp for generating in said deflecting winding a cyclical deflection current having a period of a vertical interval, the deflection current ranging between a first extreme and a second extreme during a trace interval that is shorter than the vertical interval by a time that varies with the selected scale factor; and a retrace signal generator operable to return the deflection current from the second extreme to the first extreme during a retrace interval that is positioned within a nontrace interval, but not generally positioned adjacent to either end point of the trace interval, further comprising a source of a vertical reset signal and means for delaying the vertical reset signal relative to the vertical synchronization signal for panning to a zoomed portion of a picture being displayed.

10. A video display apparatus, comprising:

a cathode ray tube;

a vertical deflection winding on said cathode ray tube;

a source of an image control signal representing an image scale factor selected from a range of values;

a source of a vertical synchronization signal;

a deflection ramp generator responsive to said synchronization and image control signals for generating a ramp with a slope that varies with the selected scale factor;

a deflection amplifier responsive to said ramp for generating in said deflecting winding a cyclical deflection current having a period of a vertical interval, the deflection current ranging between a first extreme and a second extreme during a trace interval that is shorter than the vertical interval by a time that varies with the selected scale factor; and a retrace signal generator operable to return the deflection current from the second extreme to the first extreme during a retrace interval that is positioned within a nontrace interval, but not generally positioned adjacent to either end point of the trace interval, wherein said deflection amplifier maintains said deflection current near said second extreme from the end of said trace interval to the beginning of said retrace interval and maintains said deflection current near said first extreme from the end of said retrace interval to the beginning of the next subsequent trace interval, wherein said retrace signal generator centers said retrace interval within said nontrace interval.

11. A video display apparatus, comprising:

a cathode ray tube;

a vertical deflection winding on said cathode ray tube;

a source of an image control signal representing an image scale factor selected from a range of values;

a source of a vertical synchronization signal;

a deflection ramp generator responsive to said synchronization and image control signals for generating a ramp with a slope that varies with the selected scale factor;

a deflection amplifier responsive to said ramp for generating in said deflecting winding a cyclical deflection current having a period of a vertical interval, the deflection current ranging between a first extreme and a second extreme during a trace interval that is shorter than the vertical interval by a time that varies with the selected scale factor;

a retrace signal generator coupled to said deflection amplifier for returning the deflection current form the second extreme to the first extreme during a retrace interval that is positioned within a nontrace interval; and a feedback circuit coupled to said deflection amplifier and said retrace signal generator for delaying the start of said retrace interval and maintaining the position of said retrace interval within said nontrace interval in response to variation of the slope of said ramp.

12. The video display apparatus according to claim 11, wherein said feedback circuit centers said retrace interval within said nontrace interval.

13. The video display apparatus according to claim 12, wherein said deflection amplifier maintains said deflection current near said second extreme from the end of said trace interval to the beginning of said retrace interval and maintains said deflection current near said first extreme from the end of said retrace interval to the beginning of the next subsequent trace interval.

14. The video display apparatus according to claim 11, wherein said feedback circuit includes means for generating a signal representative of average deflection current and means responsive to said average deflection current representative signal and coupled to said retrace signal generator for providing feedback control of said average deflection current.

15. A video display apparatus, comprising:

a cathode ray tube;

a vertical deflection winding on said cathode ray tube;

a source of a vertical synchronization signal;

a deflection ramp generator responsive to said synchronization signal for generating a synchronized ramp;

means for varying the slope of said ramp;

a deflection amplifier responsive to said ramp for generating in said deflecting winding a cyclical deflection current having a period of a vertical interval, the deflection current ranging between a first extreme and a second extreme during a trace interval that is shorter than the vertical interval; and a feedback circuit coupled to said deflection amplifier for delaying the start of a retrace interval and maintaining the position of said retrace interval within a nontrace interval in response to variation of the slope of said ramp.

* * * * *